Figure 1:
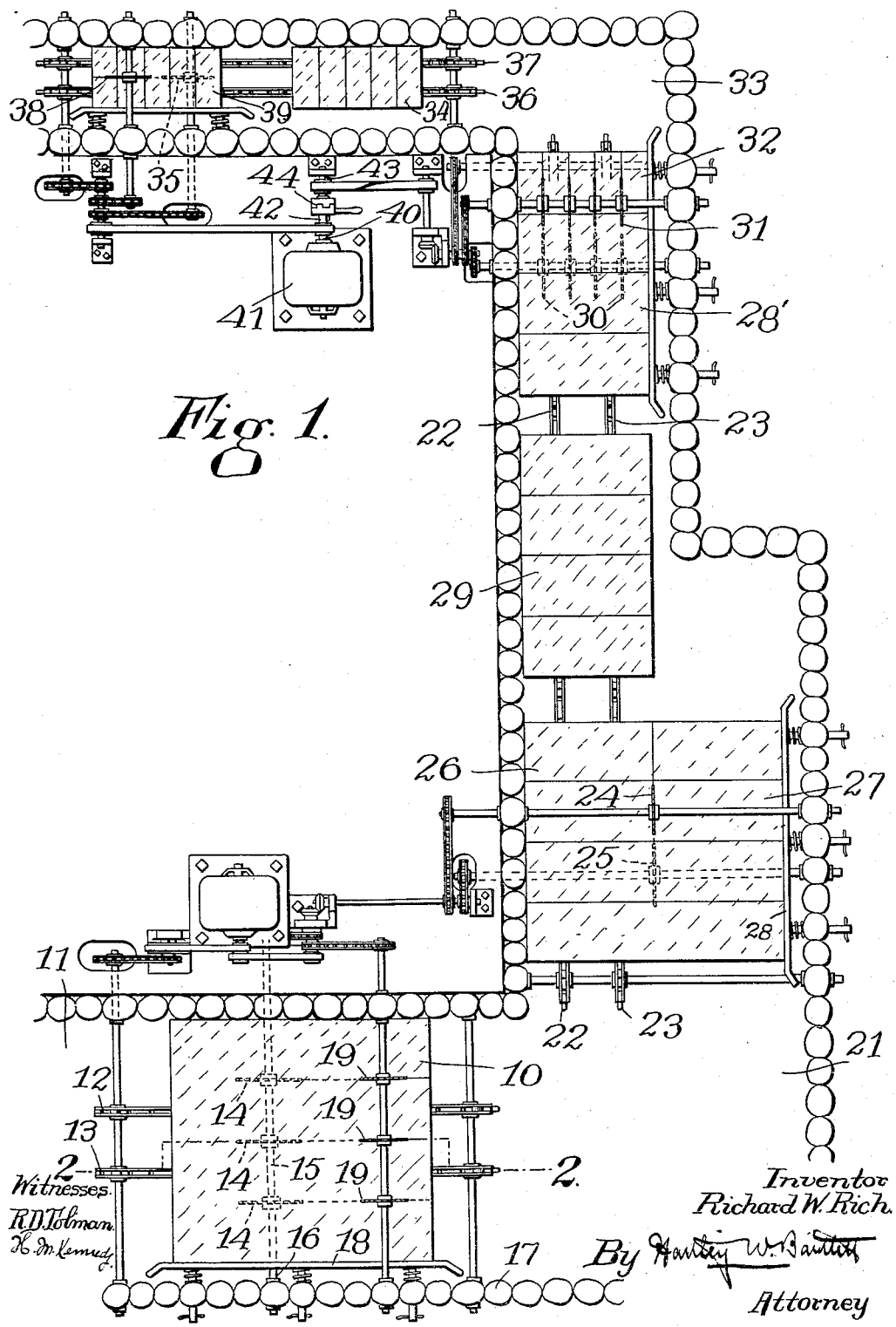

R. W. RICH.
ICE HANDLING AND CUTTING MACHINERY.
APPLICATION FILED JAN. 18, 1913.

1,159,711.

Patented Nov. 9, 1915.
2 SHEETS—SHEET 1.

Witnesses
R.D. Tolman
H. McKenney

Inventor
Richard W. Rich.
By Hartley W. Bartlett
Attorney

R. W. RICH.
ICE HANDLING AND CUTTING MACHINERY.
APPLICATION FILED JAN. 18, 1913.

1,159,711.

Patented Nov. 9, 1915.

Witnesses
R. D. Tolman.
H. M. Kennedy.

Inventor
Richard W. Rich.
By
Attorney

UNITED STATES PATENT OFFICE.

RICHARD W. RICH, OF WORCESTER, MASSACHUSETTS.

ICE HANDLING AND CUTTING MACHINERY.

1,159,711.     Specification of Letters Patent.     Patented Nov. 9, 1915.

Application filed January 18, 1913. Serial No. 742,882.

*To all whom it may concern:*

Be it known that I, RICHARD W. RICH, a citizen of the United States, residing at Worcester, in the county of Worcester, State of Massachusetts, have invented a certain new and useful Improvement in Ice Handling and Cutting Machinery, of which the following is a specification, reference being had therein to the accompanying drawings.

This invention relates to machinery for the cutting and handling of natural ice preparatory to placing this ice in an ice house.

Heretofore it has been customary to mark off and cut the entire field or a large part thereof into small cakes such as are to be put in the ice house and this has been done generally by the use of horse drawn cutters. With this method of harvesting ice it was necessary to have pleasant weather during the cutting time as rain and even snow would fill all the cuts and then freeze there. As weather is uncertain in winter it has been necessary to obtain a very large number of teams and men in order to do as much as possible in a day but men and horses are often hard to secure on short notice. When ice is cut by this method, it is also necessary to keep a gang of men calking the cuts next to the open water to prevent this water from flowing back through these channels and welding the cakes.

With the apparatus of the present invention only large floats of ice are cut in the field and this need be done only as fast as they can be transported down the channel so that there is no opportunity for welding by bad weather or overflow. These floats would usually be moved down the channel by hand or horses and then presented to the power operated conveyers which draw them past series of cutters and by successive cuts they are divided into cakes suitable for housing.

One feature of the present invention is the endless conveyer which is provided with a plurality of spurs or teeth which engage the under face of the ice.

Another feature is the cutting of the cake on both the top and bottom side.

Many other features will be described hereinafter and included in the claims.

One embodiment of the invention is shown in the drawings in which:—

Figure 2:
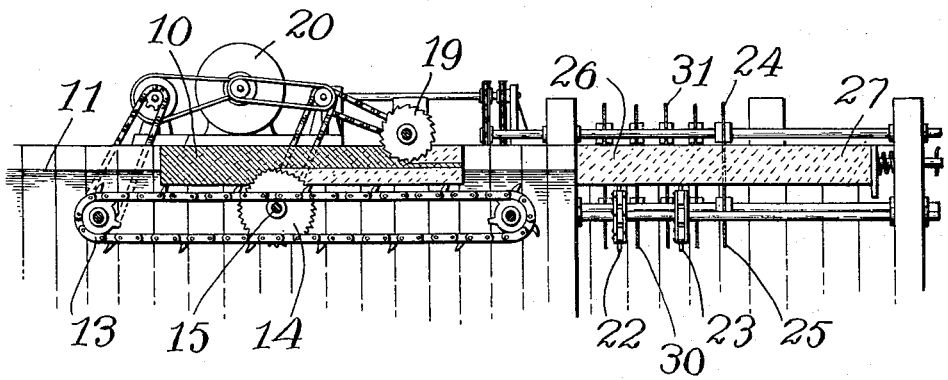

Figure 1 is a plan view of the invention complete. Fig. 2, section on line 2—2 of Fig. 1.

Referring to the drawings, the floats 10 of ice are drawn through the channel 11 leading from the ice field onto the conveyers 12 and 13. The cake is carried by these conveyers past the under-cutting saws 14 here shown three in number but any other number might be used depending on the size of the float and of cakes desired. These under-cutting saws are mounted on shaft 15 rotating in bearings 16 in the guide frames 17. These guide frames are here shown constructed of piles driven in the bottom of the pond but any other suitable type might be adopted. Upon the inside wall of one of these guide frames is placed a spring pressed frame 18 to retain the float in contact with the opposite guide frame and these prevent lateral movement of the ice as it passes by the saws. Operating in the same planes as the corresponding under-cutting saws are the three top-cutting saws 19. These may be placed directly above the under-cutting saws if desired. As it is more easy to handle a large cake than a large number of small ones, the top edge of each under-cutting saw is preferably slightly below the bottom edge of the corresponding top-cutting saw in order to leave a web. These saws 14 and 19 are here driven from the motor 20 or other suitable source of power, as best shown in Fig. 2 of the drawings. The conveyers 12 and 13 are driven in the same manner.

When the float 10 leaves the conveyers 12 and 13, it is sawed in four strips connected preferably by a web. This float is then advanced in the channel opposite to the turn 21 therein and then moved laterally onto the conveyers 22 and 23 where it is drawn past the top-cut saw 24 and the under-cut saw 25 and is by these saws cut in two sections 26 and 27 each composed of four strips. A spring pressed frame 28 is provided for the same purpose as the frame 18. As soon as the float has been divided into these two parts, the first section 26 is carried along by the carrier into the position 28′ and the second section is drawn rearwardly by hand and then moved laterally until its front end is engaged by the conveyers 22 and 23 where it follows in the path of the section 26 as indicated at 29.

Near the inner extremity of the conveyers 22 and 23 are set a series of under-cutting saws 30 and a corresponding series of top-cutting saws 31 preferably arranged in the same relative position as was described for the saws 14 and 19. These saws 30 and 31 are here each four in number and cut the section into cakes twenty in number or each cake one fortieth of the original float. A web is preferably left to hold together each cake of the section but the small sections 32 each composed of five of these cakes are separated as soon as they pass off the conveyer by a blow with a hand operated wedge bar or other suitable means and these small sections are then moved at right angles into the channel 33 as shown at 34 and are carried by conveyers 36 and 37 past an under-cutting saw 35 and a top-cutting saw 38 in the manner shown at 39 and each of the five cakes of the small section are divided into halves one eightieth of the original float. At this point these cakes are ready to be carried up into the ice house in the usual manner and such webs as remain may be broken by hand operated wedge bars or other suitable means. The saws 30, 31, 35 and 38 and the conveyers 22 and 23, 36 and 37 are here driven by the shaft 40 operatively connected to the motor 41 and this shaft is preferably constructed in two sections 42 and 43 adapted to be connected by the clutch 44 so that the section 42 of the shaft may be allowed to run while the section 43 is stationary. This prevents small sections being fed to the saws 35 and 38 faster than they can be cut. As was stated in connection with the first cutting operation, the number of saws, their relative position on their shafts and the method of passing the cake may be varied to suit the size of float used and the size of cake desired for housing. In the present embodiment rotary saws have been used to do the cutting of the ice but stationary ice plows or any other suitable form of cutter may be substituted therefor if desired. As these plows are so well known to those familiar with the art it has not been deemed necessary to illustrate the same in the drawing.

The invention is here shown with the saws and conveyers at a fixed height as would generally be the case in a pond where the level of the water was practically constant but when the device is to be used where there is a rise and fall of the water, these parts may be made adjustable vertically by mounting the bearings in slots and locking them at the desired height or in any other well known method.

The applicant is aware that a considerable number of changes in the construction and arrangement of parts might be made by anyone skilled in the art without departing from the scope of his invention, and he does not care to be limited to the particular embodiment herein shown and described.

What I claim as my invention and desire to secure by Letters Patent is:—

1. In a device of the class described, the combination of a block of ice partially submerged in water, and ice grooving means submerged in such water arranged to engage the lower side of such block as it is moved past the same while in such partially submerged condition.

2. In a device of the class described, the combination of a cake of ice partially submerged in water, and a pair of saws arranged to engage the upper and lower sides of such ice cake while in such partially submerged condition.

3. In a device of the class described, the combination of a cake of ice partially submerged in water, and a pair of circular saws arranged in the same vertical plane with the axis of one such saw above the surface of the water and of the other below such surface adapted to respectively groove the upper and lower sides of such cake as it is moved past such saws in its partially submerged condition.

4. In a device of the class described, the combination of a cake of ice partially submerged in water, a pair of ice grooving devices arranged to engage the upper and lower sides of such cake of ice when it is moved past such grooving devices in its partially submerged condition, and guiding means for said ice cake adjacent to said grooving means.

5. In a device of the class described, an endless conveyer adapted to engage a block of floating ice and transport the same upon the surface of the water, and stationary cutters located adjacent to the path of said block adapted to operate upon said block as it is carried past upon said conveyer.

6. In a device of the class described, means for engaging a block of floating ice and transporting the same upon the surface of the water, and a plurality of cutters arranged in pairs adjacent to the path of said block, the cutters of each pair being set in the same plane and the plane parallel to the direction of travel of the block, one cutter of each pair being adapted to operate upon the top face and the other upon the bottom face of the block as it is carried past by said transporting means.

7. In a device of the class described, the combination of a block of ice partially submerged in water, ice grooving means adapted to engage said block as it moves past such means, and substantially rigid supporting means for said block while it is in engagement with said grooving means.

8. In a device of the class described, the combination of a block of ice partially submerged in water, a circular saw supported with its lower portion beneath the surface of the water, means to rotate the saw, as the ice is floated there beneath, to groove its upper surface, and means acting with the water to support said block while it is being operated upon by said saw.

In testimony whereof I affix my signature in the presence of two witnesses.

RICHARD W. RICH.

Witnesses:
HARTLEY W. BARTLETT,
HANNAH M. KENNEDY.

Copies of this patent may be obtained for five cents each, by addressing the "Commissioner of Patents, Washington, D. C."